United States Patent
Derrico

(10) Patent No.: US 9,762,340 B1
(45) Date of Patent: Sep. 12, 2017

(54) SYNCHRONIZATION TIMING LOOP DETECTION SYSTEMS AND METHODS

(75) Inventor: Mark J. Derrico, Hiawassee, GA (US)

(73) Assignee: Ciena Corporation, Hanover, MD (US)

(*) Notice: Subject to any disclaimer, the term of this patent is extended or adjusted under 35 U.S.C. 154(b) by 1626 days.

(21) Appl. No.: 13/363,684

(22) Filed: Feb. 1, 2012

(51) Int. Cl.
*H04B 17/02* (2006.01)
*H04J 3/02* (2006.01)
*H04J 3/06* (2006.01)

(52) U.S. Cl.
CPC . *H04J 3/06* (2013.01); *H04J 3/02* (2013.01)

(58) Field of Classification Search
CPC ........ H04B 17/02; H04B 10/24; H04B 10/00; H04J 3/02; H04J 3/06; H04J 3/0638; H04J 3/085; H04J 14/02; H04Q 11/04
USPC ......................................................... 370/504
See application file for complete search history.

(56) References Cited

U.S. PATENT DOCUMENTS

| | | | | |
|---|---|---|---|---|
| 5,761,431 A * | 6/1998 | Gross | .................... | H04L 12/413 709/225 |
| 6,185,247 B1 * | 2/2001 | Williams | .............. | H04J 3/0638 370/503 |
| 6,567,422 B1 * | 5/2003 | Takeguchi | ............. | H04J 3/0647 370/503 |
| 6,574,245 B1 * | 6/2003 | Bedrosian | ............. | H04J 3/0647 370/503 |
| 6,707,828 B1 * | 3/2004 | Wolf | ..................... | H04J 3/0641 370/503 |
| 6,711,411 B1 | 3/2004 | Ruffini | | |
| 6,822,975 B1 * | 11/2004 | Antosik | ................... | H04J 3/085 370/538 |
| 7,012,934 B1 * | 3/2006 | Nisbet | .................... | H04J 3/0647 370/503 |
| 7,660,330 B1 | 2/2010 | Shmilovici | | |
| 2004/0148437 A1 * | 7/2004 | Tanonaka | .............. | H04J 3/0641 709/246 |
| 2010/0329284 A1 | 12/2010 | Wong et al. | | |
| 2011/0142078 A1 * | 6/2011 | Wong | .................... | H04J 3/0679 370/503 |
| 2011/0158120 A1 | 6/2011 | Hamasaki et al. | | |

OTHER PUBLICATIONS

Oscilloquartz S.A. CH-2002 Neuchatel 2, Switzerland; "Synchronization Networks Based on Synchronous Ethernet"; Application Note—No. 20/2009; Created Dec. 14, 2009.

* cited by examiner

*Primary Examiner* — Edan Orgad
*Assistant Examiner* — Vanneilian Lalchinthang
(74) *Attorney, Agent, or Firm* — Clements Bernard Walker PLLC; Christopher L. Bernard; Lawrence A. Baratta, Jr.

(57) ABSTRACT

A synchronization timing loop detection method includes monitoring an active timing reference for a flapping event at a network element, incrementing a counter for each detected flapping event, determining if the counter exceeds a threshold over a predetermined time period, and, if the counter exceeds the threshold, declaring a possible timing loop on the active timing reference. The flapping event can include the active timing reference being active followed by inactive due to synchronization status messaging and one of a logical and physical timing loop on the active timing reference. A synchronization timing loop detection system and a network element for synchronization timing loop detection for the synchronization timing loop detection method are also disclosed.

17 Claims, 4 Drawing Sheets

SYNCHRONIZATION TIMING LOOP DETECTION SYSTEMS AND METHODS

FIELD OF THE INVENTION

Generally, the field of art of the present disclosure pertains to timing and synchronization in communication networks, and more particularly, to synchronization timing loop detection systems and methods in communication networks that detect physical or logical timing loops on active timing references.

BACKGROUND OF THE INVENTION

Synchronization is a key aspect of communication networks, i.e. wavelength division multiplexing (WDM), Synchronous Optical Network (SONET), Synchronous Digital Hierarchy (SDH), Optical Transport Network (OTN), Synchronous Ethernet, Voice over Internet Protocol (VoIP), wireless networks, access networks, etc. In network embodiments, timing can be distributed to network elements through external timing references, line timing, holdover based on internal clocks, and the like. With respect to external timing references and line timing, each of these include timing facilities that are received by a network element and used to time various aspects of the network element. Disadvantageously, these timing facilities can include a physical or logical timing loop at some point away from the current network element thereby providing a timing loop to the network element. A timing loop occurs where a timing facility loops back on itself, i.e. at some point an input to the timing facility is connected to an output. From a network element's perspective, a timing loop occurs when at some point before or after the network element, the timing facility input is connected to the timing facility output. The timing loop can be physical or logical. A physical timing loop exists when a transmit fiber is actually connected (i.e., looped) to a receive fiber in the direction of the network element with the associated port assigned as a timing reference. This can occur at patch panels or anywhere the fiber is terminated. A logical loop exists when software is provisioned to provide a loop in the system in any direction, but in this case toward the network element that is attempting to use the facility or port as a timing source. Timing loops disrupt the synchronization within a network making it difficult for the network to recover from failures. Also, timing loops cause jitter (i.e., short-term phase variations) and wander (i.e., long-term phase variation including seasonal changes).

BRIEF SUMMARY OF THE INVENTION

In an exemplary embodiment, a synchronization timing loop detection method includes monitoring an active timing reference for a flapping event at a network element, incrementing a counter for each detected flapping event, determining if the counter exceeds a threshold over a predetermined time period, and, if the counter exceeds the threshold, declaring a possible timing loop on the active timing reference. The method can further include, if the counter exceeds the threshold, locking the active timing reference out and raising an alarm to a management system communicatively coupled to the network element. The flapping event can include the active timing reference being active followed by inactive due to synchronization status messaging and one of a logical and physical timing loop on the active timing reference. The network element can include an OTN element and the active timing reference can be a synchronous client in an OTN line. The synchronous client can include one of a SONET line, an SDH line, and Synchronous Ethernet. The active timing reference can include one of an external timing reference connected to the network element and a line timing reference received by the network element. The method can further include, prior to the monitoring, switching to the active timing reference, wherein prior to the switching, the active timing reference is inactive and with one of a logical and a physical timing loop disposed thereon, and subsequent to the switching, detecting the one of a logical and a physical timing loop through the monitoring, the incrementing, the determining, and the declaring steps.

In another exemplary embodiment, a synchronization timing loop detection system includes a timing complex coupled to a plurality of timing references as inputs thereto, a switching protection mechanism to maintain one of the plurality of timing references as an active reference, and circuitry implementing synchronization timing loop detection on the active timing reference. The circuitry is configured to monitor the active timing reference for a flapping event, increment a counter for each detected flapping event, determine if the counter exceeds a threshold over a predetermined time period, and, if the counter exceeds the threshold, declare a possible timing loop on the active timing reference. The circuitry can be further configured to, if the counter exceeds the threshold, lock the active timing reference out and raise an alarm to a management system communicatively coupled to the network element. The flapping event can include the active timing reference being active followed by inactive due to synchronization status messaging and one of a logical and physical timing loop on the active timing reference. The timing complex can be disposed in an OTN element and the active timing reference can be a synchronous client in an OTN line. The synchronous client can include one of a SONET line, an SDH line, and Synchronous Ethernet. The active timing reference can include one of an external timing reference connected to the timing complex and a line timing reference received by the timing complex. The circuitry can be further configured to, prior to the monitor step, switch to the active timing reference, wherein prior to the switching, the active timing reference is inactive and with one of a logical and a physical timing loop disposed thereon, and subsequent to the switching, detect the one of a logical and a physical timing loop through the monitor, the increment, the determine, and the declare steps.

In yet another exemplary embodiment, a network element for synchronization timing loop detection includes at least one line module with a plurality of ports, a timing complex coupled to a plurality of timing references from the plurality of ports as input thereto, a switching protection mechanism to maintain one of the plurality of timing references as an active reference, and circuitry implementing synchronization timing loop detection on the active timing reference. The circuitry is configured to monitor the active timing reference for a flapping event, increment a counter for each detected flapping event, determine if the counter exceeds a threshold over a predetermined time period, and, if the counter exceeds the threshold, declare a possible timing loop on the active timing reference. The circuitry can be further configured to, if the counter exceeds the threshold, lock the active timing reference out and raise an alarm to a management system communicatively coupled to the network element. The flapping event can include the active timing reference being active followed by inactive due to synchronization status messaging and one of a logical and physical timing loop on the active timing reference. The network element can be an OTN element and the active timing reference can be a synchronous client in an OTN, and the synchronous client can include one of a SONET line, a SDH line, and Synchronous Ethernet. The active timing reference can include one of an external timing reference connected to the timing complex and a line timing reference received by the timing complex. The circuitry can be further configured to, prior to the monitor step, switch to the active timing reference, wherein prior to the switching, the active timing reference is inactive and with one of a logical and a physical timing loop disposed thereon, and subsequent to the switching, detect the one of a logical and a physical timing loop through the monitor, the increment, the determine, and the declare steps.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the present disclosure relates to synchronization timing loop detection systems and methods. The timing loop detection systems and methods contemplate use with any digital networks including OTN, SONET, SDH, Synchronous Ethernet, VoIP, access networks (e.g. passive optical network, fiber-to-the-X, etc.), wireless networks (e.g. 3G/4G protocols), and the like. OTN networks, for example, while being an asynchronous protocol, use synchronous clients used to time network elements. For example, an OTN network element can include a Synchronization Protection Unit (SPU), i.e. a timing complex, that receives multiple timing facilities from synchronous clients for reference lines. With respect to non-active timing facilities, i.e. protection lines, the SPU can switch between the multiple timing facilities irrespective of one of these facilities including a physical or logical loop. The timing loop detection systems and methods avoid the network element using any of the timing facilities that include a physical or logical loop as well as provide notification to network operators of potential timing loops. The synchronization timing loop detection systems and methods are based on an observation that timing loops can cause line flapping where a timing facility is active and then down repeatedly. This line flapping can be caused by synchronization status messages being transmitted and received on the same looped facility causing successive activations and deactivations of that same facility.

Figure 1:
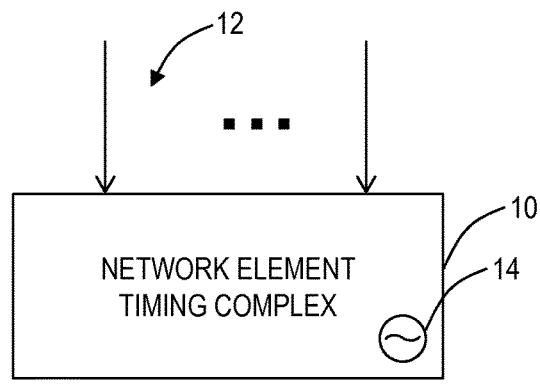
FIG. 1 is a diagram of a network element timing complex for the synchronization timing loop detection systems and methods.

Referring to FIG. 1, in an exemplary embodiment, a network element timing complex 10 is illustrated for the synchronization timing loop detection systems and methods. The timing complex 10 is part of a network element which can include, for example, any type of network element for OTN, SONET, SDH, Synchronous Ethernet, VoIP, access networks, wireless networks, etc. For example, the timing complex 10 can be part of the network element 100 of FIG. 4 described herein. Generally, network elements have two to four timing inputs 12 into the timing complex 10 although any number of inputs 12 are contemplated by the systems and methods described herein. The timing inputs 12 can include Synchronous Ethernet, Digital Signal 1 (DS1), E-carrier 1 (E1), SONET/SDH lines, etc. Synchronous Ethernet can include G.8262/Y.1362 (07/10) "Timing characteristics of a synchronous Ethernet equipment slave clock," which is incorporated by reference herein, and variants thereof. Each of the timing inputs 12 can be rated by quality, commonly called a stratum. In an exemplary embodiment, the timing complex 10 can use the highest quality stratum available to it, which can be determined by monitoring synchronization status messaging (SSM) of each of the timing inputs 12. The synchronization timing loop detection systems and methods assume all synchronous clients and external timing references operating therein use some variant of synchronization status messaging. The synchronization timing loop detection systems and methods are configured to detect logical or physical loops on the timing inputs 12, to raise an alarm based thereon, and to lock out any of the timing inputs 12 with the detected logical or physical loops. For example, the alarm could state "Timing Reference Forced Lockout has occurred due to possible timing loop" or a variation thereof.

As stated herein, the synchronization timing loop detection systems and methods assume all synchronous clients operating therein use some variant of synchronization status messaging. In an exemplary embodiment, the synchronization status messaging provides a mechanism for a timing facility to communicate quality of its clock source. For example, the timing complex 10 can be configured to use a highest available stratum quality on the inputs 12 based on monitoring associated synchronization status messaging. The timing sources 12 can include an external timing source such as a Building Integrated Timing Supply (BITS) clock, an atomic Caesium clock, a satellite-derived clock, etc. The external timing source is configured to provide synchronization status messaging indicative of a stratum level of the underlying clock. The timing sources 12 can also include a line-derived timing input which is from one of the ports on network element. For the line-derived timing input, the network element can determine a stratum quality of the line-derived timing input by monitoring S1 sync-status bytes for synchronization status messaging indicative. For example, in SONET/SDH, OC-N/STM-M clients include S1 bytes in line overhead as a sync status byte indicative of a synchronization quality of the OC-N/STM-M clients. Generally, as a last resort, in the absence of higher quality timing, the network element can go into a holdover mode until higher-quality external timing becomes available again. In this mode, the network element uses its own timing circuits as a reference such as an internal timing oscillator 14 (i.e., an internal clock).

Figure 2:
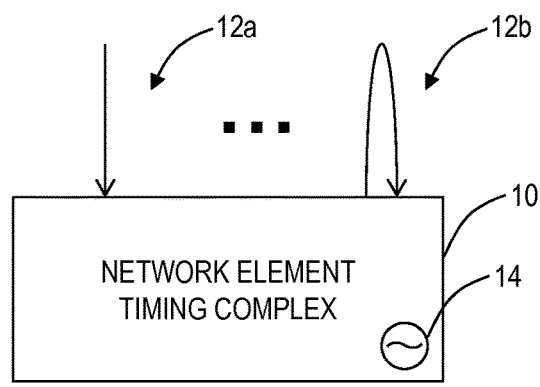
FIG. 2 is a diagram of the network element timing complex of FIG. 1 showing a switch between active timing sources with a timing loop on one of the inputs.

Referring to FIG. 2, in an exemplary embodiment, the network element timing complex 10 is illustrated showing a switch between active timing sources from input 12a to input 12b with a timing loop on the input 12b. In this example, the timing complex 10 switches from the input 12a to the input 12b with the input 12b having a timing loop thereon. The switch can occur for any number of reasons such as a loss of the input 12a, a synchronization status message from the input 12a indicating a loss of quality, etc. Upon this switch, the input 12b becomes the active timing source for the network element and the network element will switch to and from the internal timing oscillator 14 and the timing input 12b due to this timing loop. If the timing loop facility on the input 12b is the only timing source other than the internal timing oscillator 14, a flapping or rapid change from the looped facility on the input 12b and back to the internal timing oscillator 14 occurs. This flapping causes the timing complex 10 to constantly re-qualify the resources used to time all other facilities being served by the network element. In investigating the cause of this line flapping, it was determined that the line flapping is a consequence of synchronization status messaging associated messages on a physical or logical timing loop.

When a timing resource is inactive, e.g. the input 12b, an internal oscillator reference quality value is transmitted in synchronization status messaging on the line associated with the timing resource. When the timing resource is made or becomes active, e.g. switch between the input 12a and the input 12b, it is mandatory that the line associated with the timing resource begins to transmit "Do Not Use for Sync"/ "Do Not Use" (DUS/DNU) messages to avoid timing loops on another network element. In particular, these DUS/DNU messages can be provided by the timing complex 10. Unfortunately, due to the presence of a physical or logical timing loop on the input 12b, the timing complex 10 receives the DUS/DNU messages that are previously sent, i.e. the loop literally causes the DUS/DNU messages sent by the network element to be later received by the network element. Thus, when the timing complex 10 recognizes the line is transmitting DUS/DNU, the timing complex 10 will change the reference source state to down because of the SSM level being below the SSM Quality level of the Internal Oscillator and also because DUS/DNU is unusable for timing. Once the timing resource is down, then the line again begins transmitting the Internal Oscillator Quality value. This allows the line timing resource to become Active again and the entire sequence will be repeated thereby causing a flapping event.

The DUS/DNU messages are part of synchronization status messaging for SONET, SDH, Synchronous Ethernet, VoIP, access, wireless, etc. In particular, synchronization status messaging includes a first exemplary aspect where messages include indication of a stratum quality level and a second exemplary aspect where messages include management information for control of the underlying timing signal. The DUS/DNU messages are an example of this second exemplary aspect whereas an indication of stratum level (e.g., Stratum 3E (ST3E), etc.) is an example of this first exemplary aspect. The DUS/DNU messages are used to prevent the timing complex 10 from returning to a reference signal which has a risk of triggering a timing loop. However, when the timing complex 10 affirmatively switches to the input 12b that already has a timing loop, the aforementioned line flapping is experienced due to the DUS/DNU messages traversing the loop causing the timing complex 10 to oscillate between the internal timing oscillator 14 and the timing input 12b. The timing loop detection systems and methods provide a mechanism to actively detect, alarm, and lockout the active timing references with timing loops thereon.

The aforementioned flapping can occur based on a single input being a looped facility to having multiple inputs fail except for a looped facility. If the network element has never had a "Known Good" reference, e.g. Stratum 3E (ST3E) or better signal quality, the timing complex 10 will normally be in a free run mode with the internal timing oscillator 14. For example, a standard Stratum 3 (ST3) oscillator is usually supported in this "free run" mode, but ST3 oscillators do not support error free Ethernet, SONET/SDH or OTN traffic. If the network element has had a "Known Good" reference for a predetermined time period (e.g., 20 minutes), the timing complex 10 supports ST3E Oscillator quality or better and a Holdover state which will maintain the quality received from the "Known Good" reference or at least ST3E Quality and is capable of providing error free Ethernet, SONET/ SDH or OTN traffic for a period of time.

In various exemplary embodiments, the synchronization timing loop detection systems and methods detect timing loops on active timing sources of the inputs 12. Thus, using the synchronization timing loop detection systems and methods, upon the input 12b becoming the active timing source for the network element, a timing loop is subsequently detected, the input 12b can be locked out, and a warning/ alarm can be raised to alert network operators of the timing loop detection. Here, for example, the timing complex 10 would lock out the input 12b based on the line flapping and the associated timing loop detection, but any port or interface in the network element associated with the input 12b is not locked out. Specifically, the lock out is on the input 12b as a timing reference, not on the data on the line associated with the input 12b. In an exemplary embodiment, the timing complex 10 includes electrical circuitry receiving the inputs 12 and processing circuitry for processing synchronization status messages, operating the timing complex 10, and distributing timing through the network element. The synchronization timing loop detection systems and methods can be implemented through the electrical circuitry and/or processing circuitry of the timing complex.

Figure 3:
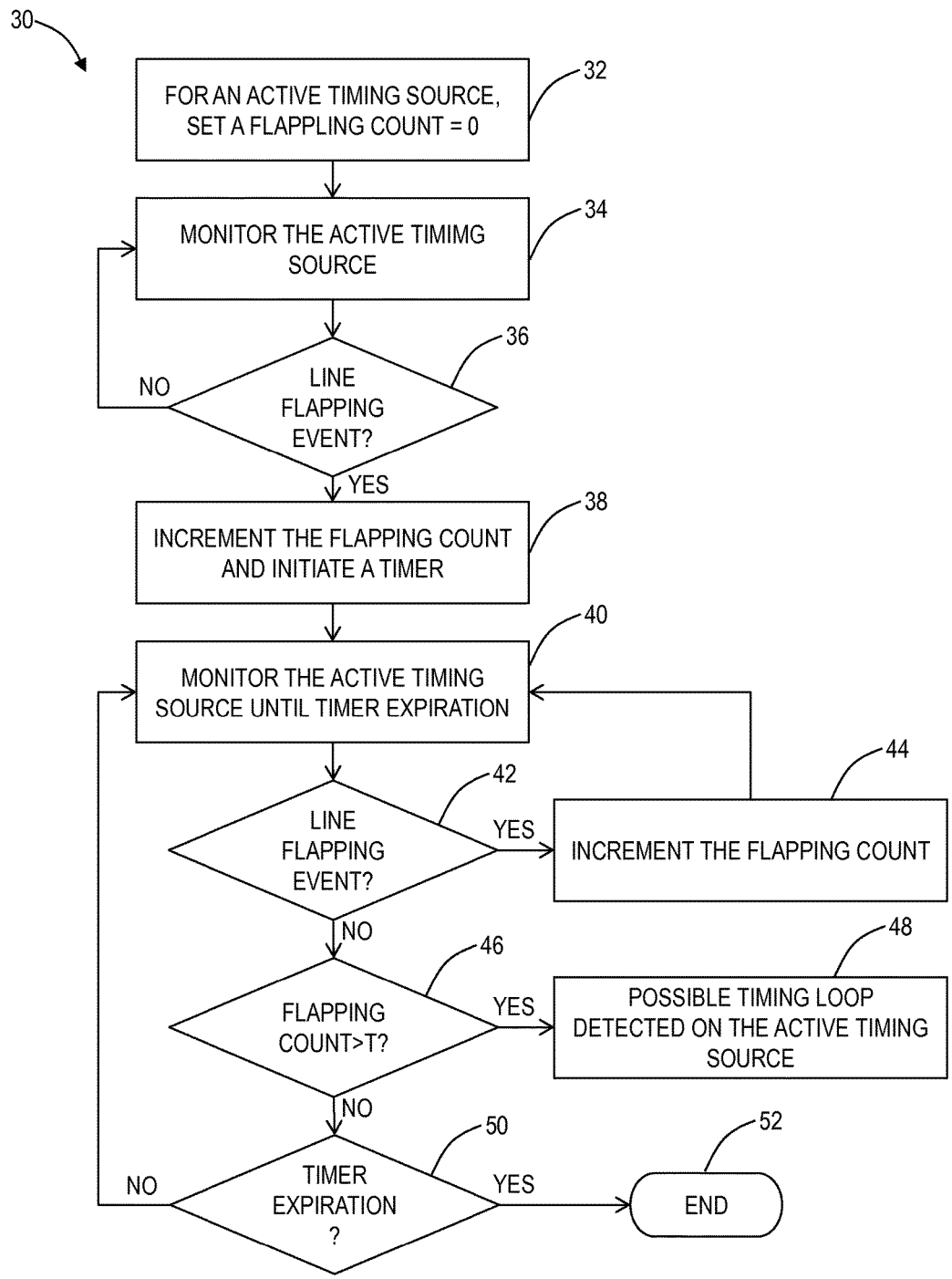
FIG. 3 is a flowchart of a synchronization timing loop detection method.

Referring to FIG. 3, in an exemplary embodiment, a flowchart illustrates a synchronization timing loop detection method 30. The timing loop detection method 30 contemplates use with the timing complex 10 or equivalent. In particular, the timing loop detection method 30 utilizes a counter, referred to as a flapping count and an integration timer with a threshold to detect a "Possible Timing Loop." For an active timing source, a flapping count is initially set to zero (step 32). The synchronization timing loop detection method 30 monitors the active timing source, such as in the timing complex 10 (step 34). While monitoring the active timing source (step 34), the method 30 checks for line flapping events (step 36). As described herein, a line flapping event is a quick up/down of the active timing reference due to a possible timing loop and synchronization status messaging on the possible timing loop. In an exemplary embodiment, the timing loop detection method 30 can be continuously operated in the timing complex 10, i.e. the steps 32, 34, 36 are continuously implemented therein. In another exemplary embodiment, the timing loop detection method 30 can be activated upon detection of a first line flapping event. Upon detection of the first line flapping event, the flapping count is incremented and a timer is initiated (step 38). The synchronization timing loop detection method 30 operates as a counter of line flapping events within a specified time period, i.e. the timer. That is, the method 30 counts timing line flapping events (e.g., oscillations between the input 12b and the oscillator 14, between the inputs 12*a*, 12*b*, etc.) in a set time period and declares a possible timing loop if a threshold is met.

As stated herein, it has been discovered that the line flapping events are a consequence of timing loops due to the status messaging thereon, and counting such events is a convenient way to quickly and efficiently detect and lockout facilities with timing loops. Accordingly, the timing loop detection method 30 monitors the active timing source until timer expiration (step 40). For each line flapping event detected, the method 30 increments the flapping count (step 44). If the flapping count exceeds a threshold, T (step 46), the method 30 declares a possible timing loop detected on the active timing source (step 48). As a consequence, the method 30 can lock out the active timing source, raise an alarm, etc. The method 30 continues to operate until the timer expiration (step 50), and if the threshold is not exceeded, the method 30 ends (step 52). The synchronization timing loop detection method 30 contemplates use on any type of network where timing references are used for synchronization. These networks can include optical networks (e.g. SONET, SDH, OTN, etc.), Ethernet networks, wireless networks, VoIP, access networks, etc. Further, the synchronization timing loop detection method 30 contemplates use on timing references with synchronization status messaging. Specifically, the synchronization timing loop detection method 30 operates by detecting line flapping of timing references which is a discovered consequence of physical or logical timing loops as the synchronization status messaging is passed therein.

OTN networks, for example, carry many synchronous clients that can be used as timing sources. If an OTN line or one of the synchronous clients provisioned as a timing source becomes looped-back toward the network element extracting timing from the synchronous client carried within the OTN network, the danger of a timing loop exists. Some examples of synchronous clients are Synchronous Ethernet, DS1/E1 BITS Source or SONET/SDH. With loop-backs on the OTN line that carries the synchronous clients, loop-backs on any of these clients or the OTN line in the direction of a network element using the client for synchronization cause a repeated Active then Down condition with a quality value of DNU/DUS if the line reference has the highest priority for protection, i.e. line flapping. This is the case if a looped DS1/E1 or SONET/SDH line is the only input 12 assigned to the timing complex 10. Therefore a simple threshold counter with a low default crossing (e.g. five by default) of transitions from Active to Down within the time period of the timer. The time period can be set based on an integration time for the timing complex 10, such as, for example, 5× the expected integration time assuming the timing reference Wait-to-Restore time is 0 minutes. The flapping count and timer could be adjusted according to integration time plus the Wait-to-Restore time.

Advantageously, the synchronization timing loop detection method 30 provides an elegant and efficient design based on a determination that line flapping is a consequence of timing loops and synchronization status messaging. No current systems and methods are based on this consequence. Bouncing or flapping of Timing references is minimized by the method 30 to the threshold parameter and the integration time. Also, qualification and requalification of the looped facility and switching from the internal timing oscillator 14 back to the looped facility (e.g. input 12*b*) with continuous re-qualification of which reference is providing timing or "FastStart" would not occur. With respect to overhead and control plane processing, the method 30 also stops some unintended Real-Time processing of switching timing references and flooding of messages due to the possible Timing Loop.

Figure 4:
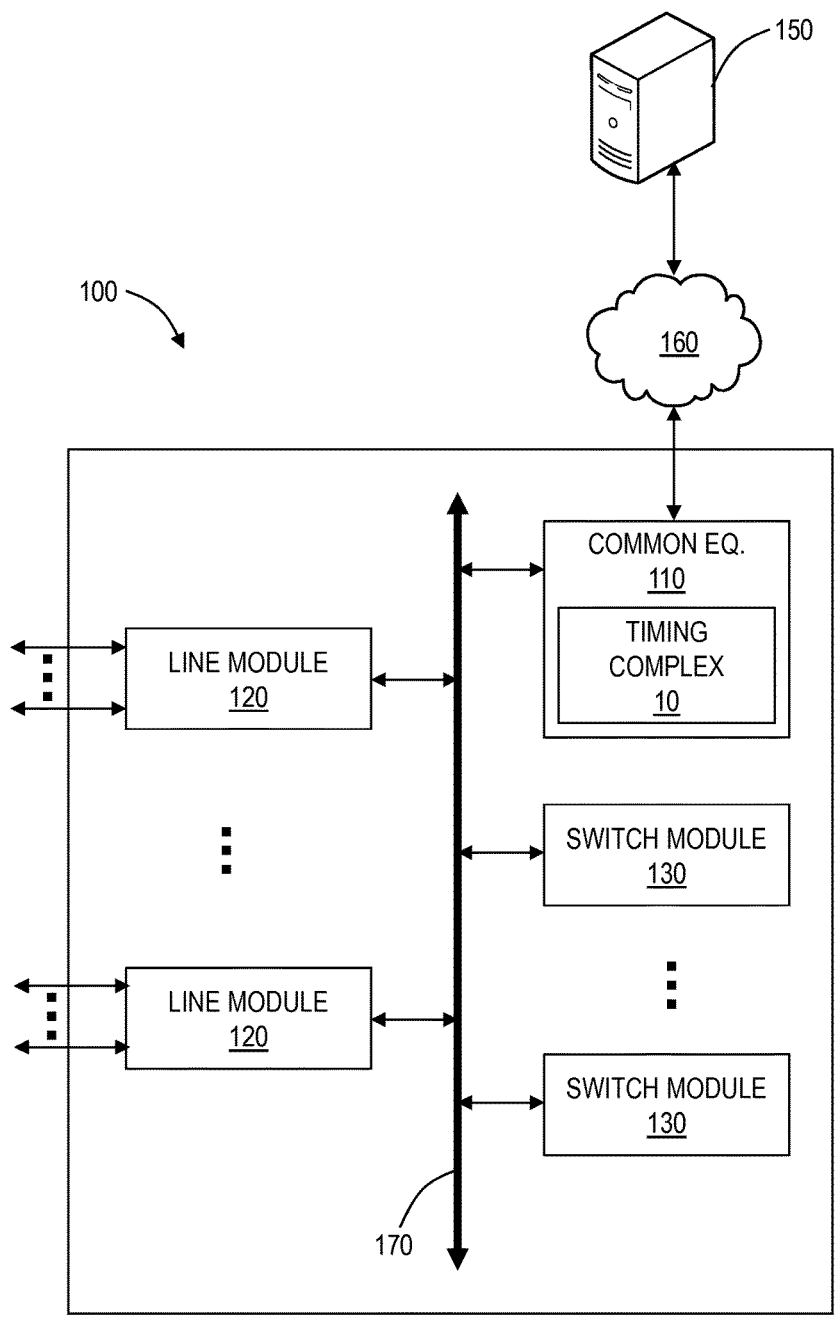
FIG. 4 is a block diagram of an exemplary network element for the synchronization timing loop detection systems and methods.

Referring to FIG. 4, in an exemplary embodiment, a block diagram illustrates an exemplary network element 100 for the synchronization timing loop detection systems and methods. In an exemplary embodiment, the network element 100 is a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 100 may include an OTN add/drop multiplexer (ADM), a SONET/SDH ADM, a multi-service provisioning platform (MSPP), a digital cross-connect (DCS), an optical switch, a router, a switch, a WDM terminal, etc. That is, the network element 100 can be any digital system with ingress and egress digital signals using synchronization thereon. While the network element 100 is generally shown as an optical network element, the timing loop detection systems and methods are contemplated for use with other types of network elements (e.g., access, wireless, VoIP, etc.).

In an exemplary embodiment, the network element 100 includes common equipment 110, one or more line modules 120, and one or more switch modules 130. The common equipment 110 may include power; a control module; operations, administration, maintenance, and provisioning (OAM&P) access; and the like. In an exemplary embodiment, the timing complex 10 can be part of the common equipment 110, although the timing complex 10 can also be located in other components of the network element 100 or distributed therein. The common equipment 110 may connect to a management system 150 through a data communication network 160. The management system 150 may include a network management system (NMS), element management system (EMS), or the like. Additionally, the common equipment 110 may include a control plane processor configured to operate a control plane as described herein. In an exemplary embodiment, detected timing loops can be communicated by the network element 100 to the management system 150 by raising a warning or an alarm thereon.

The network element 100 may include an interface 170 for communicatively coupling the common equipment 110, the line modules 120, and the switch modules 130 therebetween. For example, the interface 170 may include a backplane, mid-plane, a bus, optical or electrical connectors, or the like. The line modules 120 are configured to provide ingress and egress to the switch modules 130. In an exemplary embodiment, the line modules 120 may form ingress and egress switches with the switch modules 130 as center stage switches for a three-stage switch, e.g. a three stage Clos switch. The line modules 120 may include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. For example, synchronous clients on the line modules 120 can be used as the inputs 12 to the timing complex 10.

Further, the line modules 120 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 120 may include DWDM interfaces, short reach interfaces, and the like, and may connect to other line modules 120 on remote NEs, end clients, the edge routers, and the like. From a logical perspective, the line modules 120 provide ingress and egress ports to the network element 100, and each line module 120 may include one or more physical ports.

The switch modules 130 are configured to switch services between the line modules 120. For example, the switch modules 130 may provide wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 130 may include both Time Division Multiplexed (TDM) (i.e., circuit switching) and packet switching engines. The switch modules 130 may include redundancy as well, such as 1:1, 1:N, etc.

Those of ordinary skill in the art will recognize the network element 100 may include other components which are omitted for simplicity, and that the systems and methods described herein are contemplated for use with a plurality of different network elements with the network element 100 presented as an exemplary type of network element. For example, in another exemplary embodiment, the network element 100 may not include the switch modules 130, but rather have the corresponding functionality in the line modules 120 (or some equivalent) in a distributed fashion. For the network element 100, other architectures providing ingress, egress, and switching therebetween are also contemplated for the systems and methods described herein. In an exemplary embodiment, the synchronization timing loop detection systems and methods contemplate use with the network element 100.

Figure 5:
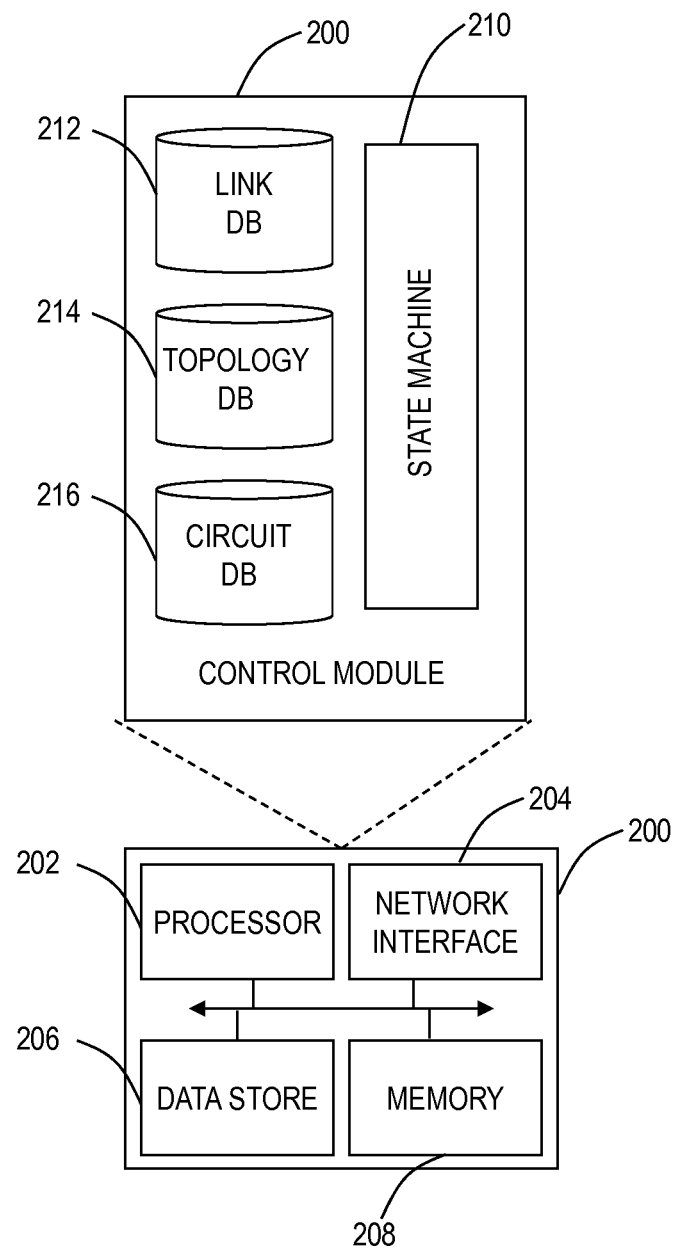
FIG. 5 is a block diagram of an exemplary control module for the synchronization timing loop detection systems and methods.

Referring to FIG. 5, in an exemplary embodiment, a block diagram illustrates a control module 200 to provide control plane processing and/or operations, administration, maintenance, and provisioning (OAM&P) for a node such as the network element 100. The control module 200 may be part of common equipment, such as common equipment 110 in the network element 100. The control module 200 may include a processor 202 which is hardware device for executing software instructions such as operating the control plane. The processor 202 may be any custom made or commercially available processor, a central processing unit (CPU), an auxiliary processor among several processors associated with the control module 200, a semiconductor-based microprocessor (in the form of a microchip or chip set), or generally any device for executing software instructions. When the control module 200 is in operation, the processor 202 is configured to execute software stored within memory, to communicate data to and from the memory, and to generally control operations of the control module 200 pursuant to the software instructions. In an exemplary embodiment, the synchronization timing loop detection systems and methods contemplate use with the control module 200.

The control module 200 may also include a network interface 204, a data store 206, memory 208, and the like, all of which are communicatively coupled therebetween and with the processor 202. The network interface 204 may be used to enable the control module 200 to communicate on a network, such as to communicate control plane information to other control modules, to the management system 150, and the like. The network interface 204 may include, for example, an Ethernet card (e.g., 10BaseT, Fast Ethernet, Gigabit Ethernet) or a wireless local area network (WLAN) card (e.g., 802.11a/b/g). The network interface 204 may include address, control, and/or data connections to enable appropriate communications on the network. The data store 206 may be used to store data, such as control plane information, provisioning data, OAM&P data, etc. The data store 206 may include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 may incorporate electronic, magnetic, optical, and/or other types of storage media. The memory 208 may include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 may have a distributed architecture, where various components are situated remotely from one another, but may be accessed by the processor 202.

From a logical perspective, the control module 200 may include a state machine 210, a link database (DB) 212, a topology DB 214, and a circuit DB 216. The control module 200 may be responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane may utilize Automatically Switched Optical Network (ASON) as defined in G.8080/Y.1304, Architecture for the automatically switched optical network (ASON) (02/2005), the contents of which are herein incorporated by reference, and the like. In another exemplary embodiment, the control plane may utilize Generalized Multi-Protocol Label Switching (GMPLS) Architecture as defined in Request for Comments: 3945 (10/2004), the contents of which are herein incorporated by reference, and the like. In yet another exemplary embodiment, the control plane may utilize Optical Signaling and Routing Protocol (OSRP) from Ciena Corporation of Linthicum, Md. which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements and establishing connections therebetween.

The state machine 210 may be configured to implement the behaviors described herein. The DBs 212, 214, 216 may be stored in the memory 208 and/or the data store 206. The link DB 712 includes updated information related to each link in a network. The topology DB 214 includes updated information related to the network topology, and the circuit DB 216 includes a listing of terminating circuits and transiting circuits at the network element 100 where the control module 200 is located. The control module 200 may utilize control plane mechanisms to maintain the DBs 212, 214, 216. For example, HELLO messages may be used to discover and verify neighboring ports, nodes, protection bundles, boundary links, and the like. Also, the DBs 212, 214, 216 may share topology state messages to exchange information to maintain identical data. Collectively, the state machine 210 and the DBs 212, 214, 216 may be utilized to advertise topology information, capacity availability, provide connection management (provisioning and restoration), and the like. Each link in a network may have various attributes associated with it such as, for example, line protection, available capacity, total capacity, administrative weight, protection bundle identification, delay, designation of boundary link, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints. This associated end-to-end provisioning may be provided on synchronous clients that are used by the network element 100 as inputs 12 to the timing complex 10.

Further, the control module 200 is configured to communicate to other control modules 200 in other nodes on the network. This communication may be either in-band or out-of-band. For SONET networks and similarly for SDH networks, the control module 200 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T G.709 are in-band side channels used to carry transmission management and signaling information within Optical Transport Network elements. The GCC channels include GCC0 and GCC1/2. GCC0 are two bytes within OTUk overhead that are terminated at every 3R (Re-shaping, Re-timing, Re-amplification) point. GCC1/2 are four bytes (i.e. each of GCC1 and GCC2 include two bytes) within ODUk overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets. It will be appreciated that the control module 200 can be configured to process synchronization status messages as well as implement the systems and methods described herein.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A synchronization timing loop detection method, comprising:
    monitoring an active timing reference for a flapping event at a network element, wherein the flapping event is detected by the network element based on detecting oscillations of the active timing reference at the network element, wherein the flapping event comprises the active timing reference being active followed by inactive and back to active, and wherein the flapping event is due to synchronization status messaging and one of a logical and physical timing loop on the active timing reference;
    incrementing a counter for each detected flapping event;
    determining if the counter exceeds a threshold of flapping events over a predetermined time period; and
    if the counter exceeds the threshold, declaring a possible timing loop on the active timing reference.

2. The method of claim 1, further comprising:
    if the counter exceeds the threshold, locking the active timing reference out and raising an alarm to a management system communicatively coupled to the network element.

3. The method of claim 1, wherein the network element comprises an Optical Transport Network element and the active timing reference is a synchronous client in an Optical Transport Network line.

4. The method of claim 3, wherein the synchronous client comprises one of a Synchronous Optical Network (SONET) line, a Synchronous Digital Hierarchy (SDH) line, and Synchronous Ethernet.

5. The method of claim 1, wherein the active timing reference comprises one of an external timing reference connected to the network element and a line timing reference received by the network element.

6. The method of claim 1, further comprising:
    prior to the monitoring, switching to the active timing reference, wherein prior to the switching, the active timing reference is inactive and with one of a logical and a physical timing loop disposed thereon; and
    subsequent to the switching, detecting the one of a logical and a physical timing loop through the monitoring, the incrementing, the determining, and the declaring steps.

7. A synchronization timing loop detection system, comprising:
    a timing complex coupled to a plurality of timing references as inputs thereto;

a switching protection mechanism to maintain one of the plurality of timing references as an active reference; and circuitry implementing synchronization timing loop detection on the active timing reference, wherein the circuitry is configured to:

monitor an active timing reference for a flapping event, wherein the flapping event is detected based on detecting oscillations of the active timing reference, wherein the flapping event comprises the active timing reference being active followed by inactive and back to active, wherein the flapping event is due to synchronization status messaging and one of a logical and physical timing loop on the active timing reference;

increment a counter for each detected flapping event;

determine if the counter exceeds a threshold of flapping events over a predetermined time period; and if the counter exceeds the threshold, declare a possible timing loop on the active timing reference.

8. The system of claim 7, wherein the circuitry is further configured to:

if the counter exceeds the threshold, lock the active timing reference out and raise an alarm to a management system communicatively coupled to the network element.

9. The system of claim 7, wherein the timing complex is disposed in an Optical Transport Network element and the active timing reference is a synchronous client in an Optical Transport Network line.

10. The system of claim 9, wherein the synchronous client comprises one of a Synchronous Optical Network (SONET) line, a Synchronous Digital Hierarchy (SDH) line, and Synchronous Ethernet.

11. The system of claim 7, wherein the active timing reference comprises one of an external timing reference connected to the timing complex and a line timing reference received by the timing complex.

12. The system of claim 7, wherein the circuitry is further configured to:

prior to the monitoring, switching to the active timing reference, wherein prior to the switching, the active timing reference is inactive and with one of a logical and a physical timing loop disposed thereon; and subsequent to the switching, detect the one of a logical and a physical timing loop through the monitor, the increment, the determine, and the declare steps.

13. A network element for synchronization timing loop detection, comprising:

at least one line module comprising a plurality of ports;

a timing complex coupled to a plurality of timing references from the plurality of ports as input thereto;

a switching protection mechanism to maintain one of the plurality of timing references as an active reference; and circuitry implementing synchronization timing loop detection on the active timing reference, wherein the circuitry is configured to:

monitor the active timing reference for a flapping event, wherein the flapping event is detected by the network element based on detecting oscillations of the active timing reference at the network element, wherein the flapping event comprises the active timing reference being active followed by inactive and back to active, and wherein the flapping event is due to synchronization status messaging and one of a logical and physical timing loop on the active timing reference;

increment a counter for each detected flapping event;

determine if the counter exceeds a threshold of flapping events over a predetermined time period; and if the counter exceeds the threshold, declare a possible timing loop on the active timing reference.

14. The network element of claim 13, wherein the circuitry is further configured to:

if the counter exceeds the threshold, lock the active timing reference out and raise an alarm to a management system communicatively coupled to the network element.

15. The network element of claim 13, wherein the network element is an Optical Transport Network element and the active timing reference is a synchronous client in an Optical Transport Network line, and wherein the synchronous client comprises one of a Synchronous Optical Network (SONET) line, a Synchronous Digital Hierarchy (SDH) line, and Synchronous Ethernet.

16. The network element of claim 13, wherein the active timing reference comprises one of an external timing reference connected to the timing complex and a line timing reference received by the timing complex.

17. The network element of claim 13, wherein the circuitry is further configured to:

prior to the monitoring, switching to the active timing reference, wherein prior to the switching, the active timing reference is inactive and with one of a logical and a physical timing loop disposed thereon; and subsequent to the switching, detect the one of a logical and a physical timing loop through the monitor, the increment, the determine, and the declare steps.

* * * * *